M. H. MOSES.
MOTOR VEHICLE BUMPER AND FENDER.
APPLICATION FILED MAY 16, 1921.
1,425,127.
Patented Aug. 8, 1922.
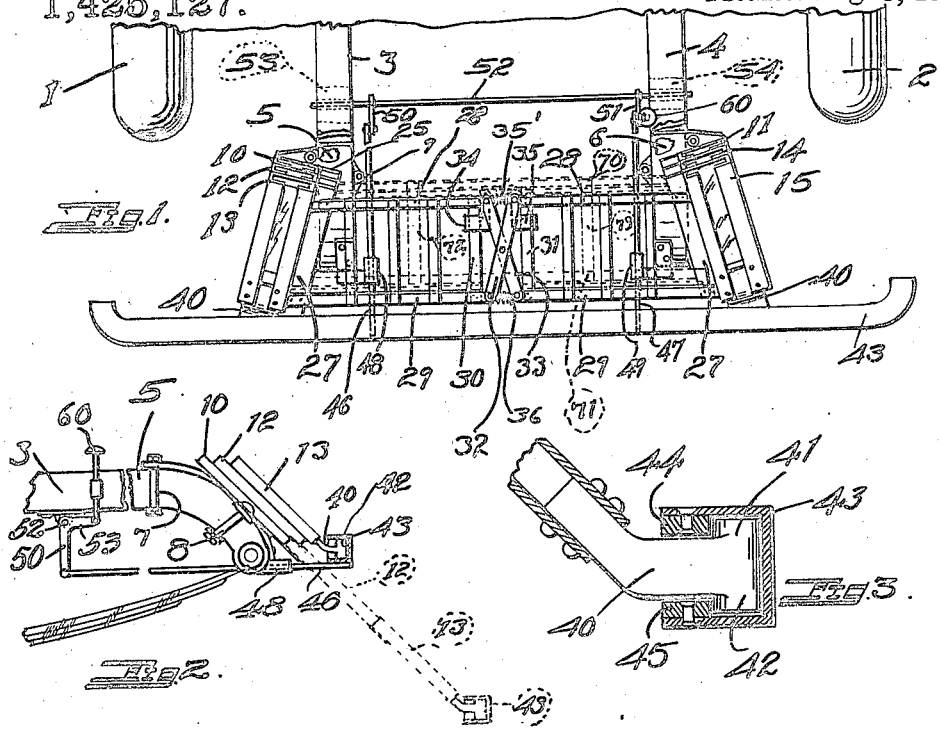
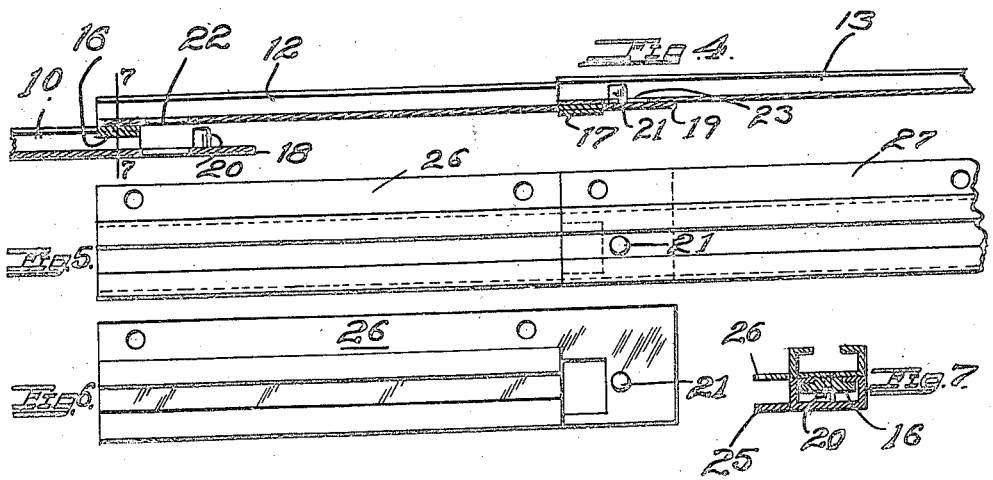
INVENTOR.
Max H. Moses.
BY
Carlos P. Griffin
ATTORNEY.

UNITED STATES PATENT OFFICE.

MAX H. MOSES, OF SAN FRANCISCO, CALIFORNIA.

MOTOR-VEHICLE BUMPER AND FENDER.

1,425,127.  Specification of Letters Patent.  Patented Aug. 8, 1922.

Application filed May 16, 1921. Serial No. 469,851.

*To all whom it may concern:*

Be it known that I, MAX H. MOSES, a citizen of the United States, residing at San Francisco, in the county of San Francisco, State of California, have invented a new and useful Motor-Vehicle Bumper and Fender, of which the following is a specification in such full and clear terms as will enable those skilled in the art to construct and use the same.

This invention relates to a bumper for motor vehicles and its object is to provide a bumper which will normally be sufficiently raised from the streets to pass over all ordinary obstructions but which may be quickly dropped to prevent the vehicle from passing over a pedestrian who may happen to be in the path of the vehicle.

Another object of the invention is to provide a vehicle with a bumper which will be capable of withstanding a heavy blow from another vehicle without dropping the bumper.

While this invention is shown applied to the frame of an automobile, it will be clear that it may be applied to any motor vehicle or car equally well.

Other objects of the invention will appear as the description proceeds.

An embodiment of the invention is shown in the accompanying drawings in which the same reference numeral is applied to the same portion throughout but I am aware that there may be modifications thereof.

Fig. 1 is a plan view of the front portion of the vehicle with the bumper in its folded position. The two upper bumpers having their transverse connecting bar shown in dotted lines to aid in illustration.

Fig. 2 is a side elevation of the front portion of the vehicle showing the bumper as it appears in its raised or folded position, the dotted lines indicating its position when extended.

Fig. 3 is a transverse sectional view through the bumper bar showing the manner of connecting it to its support.

Fig. 4 is a side view in section of the slidable bumper supports.

Fig. 5 is a plan view of two of the bumper supports.

Fig. 6 is a plan view of one of the bumper supports, and

Fig. 7 is a transverse sectional view of two of the bumper supports.

The numerals 1 and 2 indicate the vehicle wheels. 3 and 4 the projecting portions of the vehicle frame. This frame is provided with two curved plates 5 and 6 at its front ends, which plates are secured in place by means of bolts 7 to 9 inclusive for each plate. Each plate supports a grooved bar as indicated at 10 and 11. These two grooved bars in turn support grooved bars 12, 13 and 14, 15 respectively. The two upper pairs of grooved bars slide down on the under bars 10 and 11 and upon each other so that when the bumper is fully extended it assumes the position shown in dotted lines in Figure 2.

The bars 12 and 13 are provided with guides as indicated at 16 and 17 which guides are slidable in the grooves of the bars 10 and 12 respectively at the lower end. The bars 10 and 12 have projecting tongues 18 and 19 which support the bars 12 and 13 respectively and in order to prevent the bars 12 and 13 from moving longitudinally more than they should there is a pin 20 in the tongue 18 and a similar pin 21 in the tongue 19. These pins pass through corresponding holes 22, 23 in the bars 12 and 13 respectively.

It will be understood that the bars 11, 14 and 15 are constructed precisely the same as the bars 10, 12 and 13, so that no special description is given of them.

Each of the bars has a laterally extending flange as indicated at 25, 26 and 27. Each laterally extending flange is connected to two cross bars 28, 29, said bars being connected to two cross bars 30, 31 at their inner ends and they are in turn connected to two links 32, 33, said links being pivotally connected to the adjacent end of the two bars 29 and connected at their upper ends to slides 34, 35 movable on the two bars 30, 31.

Springs 35′, 36 are secured at the ends of the two pivoted links 32, 33 for the purpose of expanding the apparatus as it slides down. The slides 13 and 15 have forwarding projecting horns 40 at their lower ends which horns are provided with two lugs 41, 42 extending into the channel shaped chamber 43. Plates 44, 45 hold the bumper in place on the two horns and allow the horns to slide laterally as the bars drop down.

When the apparatus is raised as shown in Figure 1 it is supported by two bars 46, 47 which pass through guide brackets 48 49 and which are connected at their rear ends to two depending bell crank levers 50, 51. These bell crank levers are in turn carried by a shaft 52 supported in two bearings 53, 54 in the under side of vehicle frame, and when it is desired to release the bumper and drop it down to the position shown in Figure 2, the operator of the car will place his foot on the button 60 which is connected to either of the bell crank levers as may be most convenient.

The operation of the apparatus is as follows: Assuming the car to be in its normal use the bumper will be raised to the position shown in solid lines in Figure 2. In that position it will act as a bumper under all ordinary circumstances. However, if a pedestrian happens to get too close to the vehicle so as to perhaps be struck thereby, the vehicle operator may drop the bumper by placing his foot on the button 60, whereupon the two movable slides are dropped down as illustrated in dotted lines in Figure 2. Inasmuch as the two slides 10 and 11 are immovable with respect to the frame, they are provided with two laterally extending bars 70, 71 which are connected by two cross bars 72, 73.

What I claim is as follows, but various modifications may be made in the construction shown in the drawings and above particularly described form, within the purview of my invention:

1. A combined bumper and fender for motor vehicles comprising a pair of fixed slides, movable slides supported thereby, a grill work connecting the movable slides, a bumper carried by the movable slides, means to support the movable slides and grill work carried thereby over the fixed slides and means to release the movable slides at will to drop them toward the ground.

2. A combined bumper and fender for motor vehicles comprising a pair of fixed slides, movable slides supported by the fixed slides, a grill work connecting the movable slides, resilient means to force the grill work open, means to support the movable slides and grill work carried thereby over the fixed slides, a bumper carried by the movable slides and means to release the movable slides at will.

3. In a combined bumper and fender of the class described the combination of a pair of fixed slides, movable slides carried thereby, the lower ends of which are further apart than their upper ends, a grill work connecting the movable slides, a bumper supported by the movable slides, said bumper having a slot to permit the movable slides to move longitudinally thereof, means to support the movable slides in a raised position, and means to drop the movable slides at will.

In testimony whereof I have hereunto set my hand this 3rd day of May A. D. 1921.

MAX H. MOSES.